US008714134B2

(12) United States Patent
De Gooijer

(10) Patent No.: US 8,714,134 B2
(45) Date of Patent: May 6, 2014

(54) RECIPROCATING PISTON MECHANISM AND A METHOD OF INCREASING INTERNAL EGR IN AN INTERNAL COMBUSTION ENGINE

(75) Inventor: Lambertus Hendrik De Gooijer, Naarden (NL)

(73) Assignee: Gomecys B.V., Naarden (NL)

( * ) Notice: Subject to any disclaimer, the term of this patent is extended or adjusted under 35 U.S.C. 154(b) by 504 days.

(21) Appl. No.: 12/866,942

(22) PCT Filed: Feb. 13, 2009

(86) PCT No.: PCT/EP2009/051702
§ 371 (c)(1),
(2), (4) Date: Aug. 10, 2010

(87) PCT Pub. No.: WO2009/101173
PCT Pub. Date: Aug. 20, 2009

(65) Prior Publication Data

US 2011/0036334 A1 Feb. 17, 2011

(30) Foreign Application Priority Data

Feb. 13, 2008 (WO) ................. PCT/EP2008/051727

(51) Int. Cl.
*F02B 47/08* (2006.01)
*F16C 3/28* (2006.01)

(52) U.S. Cl.
USPC .......................... 123/197.4; 74/602; 123/78 F

(58) Field of Classification Search
USPC ............... 123/197.1, 197.4, 78 F, 78 R, 78 E, 123/78 BA, 568.14; 92/140; 74/600, 601, 74/602, 837, 49, 52
See application file for complete search history.

(56) References Cited

U.S. PATENT DOCUMENTS 2,271,766 A 2/1942 Huebotter (Continued)

FOREIGN PATENT DOCUMENTS

AU 7857681 A * 6/1982

(Continued)

OTHER PUBLICATIONS

Written opinion of the European Patent Office in counterpart foreign application No. PCT/EP2009/051702 filed Feb. 13, 2009.

(Continued)

*Primary Examiner* — Stephen K Cronin
*Assistant Examiner* — John Zaleskas
(74) *Attorney, Agent, or Firm* — Steven M. Koehler; Westman, Champlin & Koehler, P.A.

(57) ABSTRACT

A reciprocating piston mechanism comprises a crankcase and a crankshaft having at least a crankpin The crankshaft is rotatable about a crankshaft axis. The mechanism comprises a crank member which is rotatably mounted on the crankpin, and comprises at least a bearing portion which is eccentrically disposed with respect to the crankpin. The bearing portion has an outer circumferential wall which bears the big end of a connecting rod such that the connecting rod is rotatably mounted on the bearing portion of the crank member via the big end. The crank member is provided with a crank member gear which meshes with a first auxiliary gear being an external gear. The first auxiliary gear is fixed to a second auxiliary gear via a common auxiliary shaft The auxiliary shaft is mounted to the crankshaft and rotatable with respect thereto about an auxiliary shaft axis which extends parallel to the crankshaft axis. The second auxiliary gear meshes with a central gear having a center line which coincides with the crankshaft axis. The crank member gear is an internal gear.

20 Claims, 15 Drawing Sheets

(56) References Cited

U.S. PATENT DOCUMENTS

| | | | | | |
|---|---|---|---|---|---|
| 3,686,972 | A | * | 8/1972 | McWhorter | 74/602 |
| 3,861,239 | A | * | 1/1975 | McWhorter | 74/602 |
| 4,152,955 | A | * | 5/1979 | McWhorter | 74/602 |
| 4,237,741 | A | * | 12/1980 | Huf et al. | 74/52 |
| 4,860,702 | A | | 8/1989 | Doundoulakis | |
| 5,170,757 | A | * | 12/1992 | Gamache | 123/197.4 |
| 5,482,015 | A | * | 1/1996 | Fish | 123/197.4 |
| 5,605,120 | A | | 2/1997 | Hedelin | |
| 5,611,301 | A | | 3/1997 | Bergsten et al. | |
| 5,927,236 | A | * | 7/1999 | Gonzalez | 123/78 F |
| 6,349,684 | B1 | * | 2/2002 | de Gooijer | 123/78 F |
| 7,293,542 | B2 | * | 11/2007 | Ozdamar | 123/197.1 |
| 2006/0053964 | A1 | * | 3/2006 | Venettozzi | 74/595 |
| 2009/0188337 | A1 | * | 7/2009 | Chio | 74/457 |
| 2011/0036334 | A1 | | 2/2011 | De Gooijer | |
| 2012/0180583 | A1 | | 7/2012 | De Gooijer | |

FOREIGN PATENT DOCUMENTS

| | | | | |
|---|---|---|---|---|
| AU | 7857681 | A1 | * | 6/1982 |
| DE | 181913 | | | 3/1907 |
| DE | 488059 | C | * | 12/1929 |
| DE | 3642681 | | | 12/1986 |
| EP | 0184042 | A2 | * | 11/1985 |
| EP | 0184042 | A | | 6/1986 |
| EP | 0345366 | | | 12/1989 |
| FR | 986605 | A | * | 11/1943 |
| FR | 986605 | A | | 8/1951 |
| FR | 2680402 | | | 2/1993 |
| GB | 173252 | | | 12/1921 |
| GB | 1094649 | | | 12/1967 |
| JP | 2007113471 | A | | 5/2007 |
| WO | WO 86/07115 | | | 12/1986 |
| WO | WO 8607115 | A1 | * | 12/1986 |
| WO | WO 02/059503 | | | 8/2002 |
| WO | WO 2006/004612 | | | 1/2006 |
| WO | WO 2008/129025 | | | 10/2008 |
| WO | WO 2009/100759 | | | 8/2009 |
| WO | WO 2011/006537 | | | 1/2011 |

OTHER PUBLICATIONS

Official Search Report of the European Patent Office in counterpart foreign application No. PCT/EP2009/051702 filed Feb. 13, 2009.

International Search Report of the European Patent Office Patent Office in foreign application No. PCT/EP2009/059040 filed Jul. 15, 2009.

Notice of Reasons for Rejection for Japanese Application No. 2010-546348, mailing date Nov. 6, 2012.

Notice of Reasons for Rejection for Japanese Application No. 2010-546348, mailed Nov. 6, 2012.

Decision of Rejection for Japanese Application No. 2010-546348, mailed Jun. 11, 2013.

* cited by examiner

RECIPROCATING PISTON MECHANISM AND A METHOD OF INCREASING INTERNAL EGR IN AN INTERNAL COMBUSTION ENGINE

CROSS-REFERENCE TO RELATED APPLICATION

The present application is a national stage filing of International patent application Serial No. PCT/EP2009/051702, filed Feb. 13, 2009, and published as WO 2009/101173A1 in English.

BACKGROUND

The discussion below is merely provided for general background information and is not intended to be used as an aid in determining the scope of the claimed subject matter.

Aspects of the present invention relate to a reciprocating piston mechanism comprising a crankcase, a crankshaft having at least a crankpin, said crankshaft being supported by the crankcase and rotatable with respect thereto about a crankshaft axis, at least a connecting rod including a big end and a small end, a piston being rotatably connected to the small end, a crank member being rotatably mounted on the crankpin, and comprising at least a bearing portion which is eccentrically disposed with respect to the crankpin, and having an outer circumferential wall which bears the big end of the connecting rod such that the connecting rod is rotatably mounted on the bearing portion of the crank member via the big end; wherein the crank member is provided with a crank member gear which meshes with a first auxiliary gear being an external gear, wherein the first auxiliary gear is fixed to a second auxiliary gear via a common auxiliary shaft, which auxiliary shaft is mounted to the crankshaft and rotatable with respect thereto about an auxiliary shaft axis extending parallel to the crankshaft axis, which second auxiliary gear meshes with a central gear having a center line which coincides with the crankshaft axis.

Such a reciprocating piston mechanism is known from EP 0 184 042. The known mechanism comprises a crank member which is driven by the crankshaft through first and secondary auxiliary gears and additional gears.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In an aspect of the invention, the crank member gear is an internal gear. The reciprocating piston mechanism according to an aspect of the invention provides the opportunity to build a compact mechanism, which does neither require driving means for rotating the central gear at a certain rotation frequency nor relative large gear dimensions in case of a central gear which is not rotated at a certain rotation frequency.

The auxiliary shaft axis is spaced from the crankshaft axis which means that upon rotating the crankshaft the first auxiliary shaft is rotated about the crankshaft axis at similar speed as the crankshaft. Depending on the configuration and dimensions of the central gear, the second auxiliary gear, the first auxiliary gear and the crank member gear, the crank member is driven at a certain speed and direction by the mentioned cooperating gears. In one embodiment, the crank member rotates at a rotation frequency with respect to the crankcase which is substantially half of that of the crankshaft.

In a practical embodiment the second auxiliary gear is an external gear and the central gear is an internal gear. In order to rotate the crank member at a rotation frequency with respect to the crankcase which is substantially half of that of the crankshaft and in the same direction thereof, the central gear may stand still to obtain a compact mechanism. This means that no additional driving means or additional gears are necessary to drive the second auxiliary gear. Instead, the second auxiliary gear is driven by means of rolling off along the teeth of the central gear upon rotating the crankshaft. The gear ratio between the central gear and the second auxiliary gear may be half as high as the gear ratio between the crank member gear and the first auxiliary gear. This condition may be achieved by a certain choice of diameters and gear teeth modulus.

In one embodiment the auxiliary shaft extends through a crank arm of the crankshaft, and the first and second auxiliary gears are disposed at opposite sides of the crank arm. In practice the crank arm is a joint element which is disposed between the crankpin and a central cylindrical part of the crankshaft which is often a bearing of the crankshaft. The crank arm serves to keep the crankpin at an eccentrical position with respect to the cylindrical part. The advantage of this embodiment is that the distance between two crank arms can be short.

The second auxiliary gear may be disposed adjacent to at least a crankshaft bearing portion as seen in axial direction of the crankshaft axis. This further improves compactness of the mechanism in axial direction of the crankshaft axis.

In one embodiment, the second auxiliary gear is disposed between two crankshaft bearing portions as seen in axial direction of the crankshaft axis, because this provides a more stable bearing condition of the crankshaft.

The central gear may be rotatably mounted in the crankcase. This provides the opportunity to turn the central gear in order to adjust the position of the crank member with respect to the crankshaft at each position of the crankshaft. This means that the crank member may be rotated at substantially half of the speed of the crankshaft, but that the position of the crank member with respect to the position of the crank shaft at an arbitrarily selected crank angle position may vary within a certain range. For example, the position of the crank member can be adjusted such, that in top dead center the position of the piston with respect to the crankcase may be varied. Applying this embodiment in an internal combustion engine provides the opportunity to vary compression ratio, and to use a longer expansion stroke in combination with a shorter exhaust stroke for increasing internal EGR (Exhaust Gas Recirculation).

The central gear may be drivable by a driving means, such as an electric motor using a transmission including gears, for example.

The crankshaft may be provided with a crankshaft bearing, wherein the auxiliary shaft extends within the outer circumference of the crankshaft bearing. In practice, the auxiliary shaft may extend within the inner side of the crankshaft. The advantage of this configuration is that a very compact structure is obtained.

The crankshaft may comprises at least a second crankpin which is angularly spaced with respect to the crankpin about the crankshaft axis, and at least a second crank member rotatably mounted on the second crank pin, wherein the second crank member is provided with a second crank member gear being an internal gear which meshes with a third auxiliary gear being an external gear, wherein the third auxiliary gear is fixed to a fourth auxiliary gear via a common second auxiliary shaft, which second auxiliary shaft is mounted to the crankshaft and rotatable with respect thereto about a second auxiliary shaft axis extending parallel to the crankshaft axis, which fourth auxiliary gear meshes with the central gear. In terms of an internal combustion engine this mechanism may be applied in a four-cylinder engine having two cylinders per crankpin. The advantage of this embodiment is that the driving means for driving the crank member and the second crank member are centrally disposed between the first and second crankpin as seen in axial direction of the crankshaft axis. This means that the engine can be built compactly by applying a relatively simple mechanism, whereas no parts for driving the crank member and second crank member are necessary on the engine at opposite end portions of the crankshaft.

The mechanism may be adapted such that the fourth auxiliary gear is integrated in the second auxiliary gear, and the second auxiliary shaft is integrated in the auxiliary shaft such that the auxiliary shaft axis and the second auxiliary shaft axis coincide. In this case, only a single auxiliary shaft is necessary, whereas the fourth auxiliary gear is in fact eliminated. This further simplifies the mechanism.

In this embodiment the auxiliary shaft and/or the second auxiliary shaft may extend within the outer circumference of the crankshaft bearing.

The invention also relates to a method of increasing internal EGR in a four-stroke internal combustion engine, which engine comprises a crankcase, a crankshaft having at least a crankpin, said crankshaft being supported by the crankcase and rotatable with respect thereto about a crankshaft axis, at least a connecting rod including a big end and a small end, a piston being rotatably connected to the small end, a crank member being rotatably mounted on the crankpin, and comprising at least a bearing portion which is eccentrically disposed with respect to the crankpin, and having an outer circumferential wall which bears the big end of the connecting rod such that the connecting rod is rotatably mounted on the bearing portion of the crank member via the big end, wherein the crank member is substantially rotated at a rotation frequency with respect to the crankcase which is substantially half of that of the crankshaft, and wherein the crank member is positioned with respect to the crankpin such that in top dead center of the piston the maximum eccentricity is angled with respect to a first plane extending through the crankshaft axis and a center line of the crankpin, and with respect to a second plane extending perpendicular to the first plane and parallel to the crankshaft axis. Due to these features the engine can have a long expansion stroke in combination with a short exhaust stroke since top dead center of the piston at the end of the exhaust stroke is lower than at the end of the compression stroke. As a consequence a relatively high internal EGR rate can be achieved.

An aspect of the invention also relates to a reciprocating piston mechanism comprising a crankcase, a crankshaft having at least a crankpin, said crankshaft being supported by the crankcase and rotatable with respect thereto about a crankshaft axis, at least a connecting rod including a big end and a small end, a piston being rotatably connected to the small end, a crank member being rotatably mounted on the crankpin, and comprising at least a bearing portion which is eccentrically disposed with respect to the crankpin, and having an outer circumferential wall which bears the big end of the connecting rod such that the connecting rod is rotatably mounted on the bearing portion of the crank member via the big end, wherein the crank member is provided with a crank member gear, being an external gear, which meshes with a first auxiliary gear, being an external gear, wherein the first auxiliary gear is fixed to a second auxiliary gear, being an external gear, via a common auxiliary shaft, which auxiliary shaft is mounted to the crankshaft and rotatable with respect thereto about an auxiliary shaft axis extending parallel to the crankshaft axis, which second auxiliary gear meshes with an intermediate auxiliary gear, being an external gear, which intermediate auxiliary gear also meshes with a central gear, being an internal gear, having a center line which coincides with the crankshaft axis. The intermediate auxiliary gear serves to rotate the auxiliary shaft in opposite direction.

An aspect of the invention also relates to a reciprocating piston mechanism comprising a crankcase, a crankshaft having at least a crankpin, said crankshaft being supported by the crankcase and rotatable with respect thereto about a crankshaft axis; at least a connecting rod including a big end and a small end; a piston being rotatably connected to the small end; a crank member being rotatably mounted on the crankpin, and comprising at least a bearing portion which is eccentrically disposed with respect to the crankpin, and having an outer circumferential wall which bears the big end of the connecting rod such that the connecting rod is rotatably mounted on the bearing portion of the crank member via the big end; wherein the crank member is drivably connected to an auxiliary shaft via a first transmission wherein the auxiliary shaft is mounted to the crankshaft and rotatable with respect thereto about an auxiliary shaft axis extending parallel to the crankshaft axis, wherein the auxiliary shaft is drivably connected to a central ring via a second transmission, wherein the central ring has a center line which coincides with the crankshaft axis; wherein the first and second transmission are adapted such that the crank member rotates at a rotation frequency with respect to the crankcase which is substantially half of that of the crankshaft when the central ring has a fixed position with respect to the crankcase. The advantage of this mechanism is that it is relatively simple because it is not necessary to drive the central ring.

In a practical embodiment the first transmission comprises a crank member gear being an internal gear and mounted to the crank member, and a first auxiliary gear being an external gear and fixed to the auxiliary shaft, wherein the crank member gear and the first auxiliary gear mesh with each other.

The second transmission may comprise a second auxiliary gear being an external gear and mounted to the auxiliary shaft, which second auxiliary gear meshes with an internal gear of the central ring.

In an alternative embodiment the first transmission may comprise a crank member gear being an external gear and mounted to the crank member, and a first auxiliary gear being an external gear and fixed to the auxiliary shaft, wherein the crank member gear and the first auxiliary gear mesh with each other.

The second transmission may comprise a second auxiliary gear being an external gear and mounted to the auxiliary shaft, which second auxiliary gear meshes with an intermediate auxiliary gear, being an external gear, which intermediate auxiliary gear also meshes with an internal gear of the central ring. The intermediate auxiliary gear serves to direct the rotational direction of the crank member in the same rotational direction as the crankshaft.

In a further alternative embodiment the first transmission comprises a wheel being mounted to the crank member and an auxiliary wheel being fixed to the auxiliary shaft, wherein the wheel and the auxiliary wheel are drivably connected to each other through an endless driving element. In practice the wheel and the auxiliary wheel are sprocket wheels and the endless driving element is a chain. Furthermore, the second transmission may comprise a second auxiliary gear being an external gear and mounted to the auxiliary shaft, which second auxiliary gear meshes with an internal gear of the central ring including. The advantage of the latter embodiment is that due to the configuration of the first transmission, the second transmission does not require an intermediate auxiliary gear in order to reverse the direction of rotation.

BRIEF DESCRIPTION OF THE DRAWINGS

Aspects of the invention will hereafter be elucidated with reference to the schematic drawings showing embodiments of the invention by way of example.

DETAILED DESCRIPTION OF THE ILLUSTRATIVE EMBODIMENTS

Figure 2:
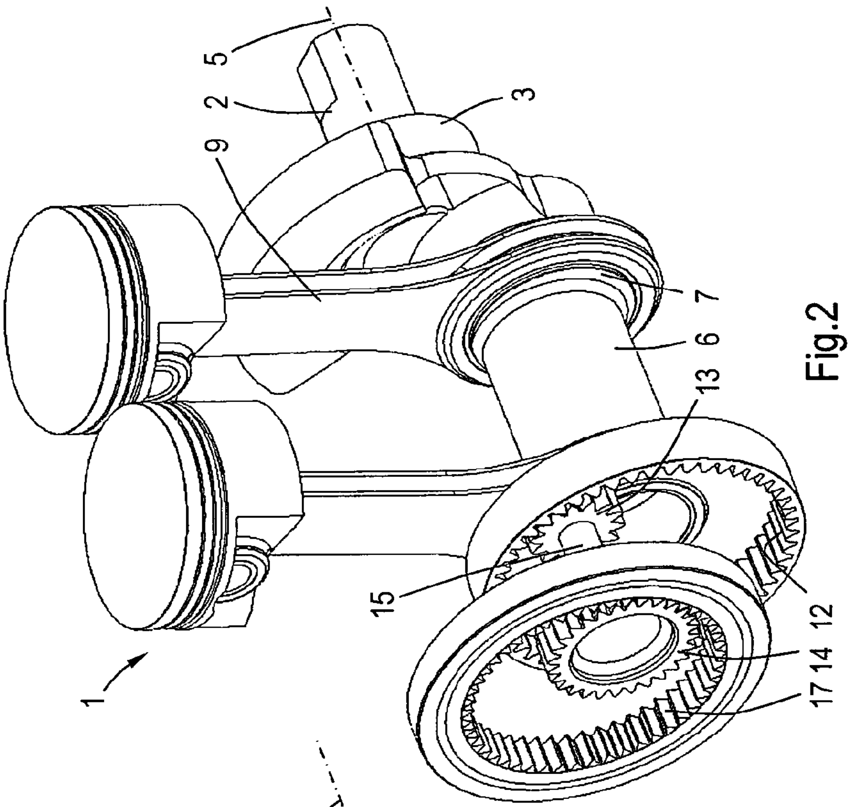
FIG. 2 is a similar view as FIG. 1, but without a part of the crankshaft.
Figure 1:
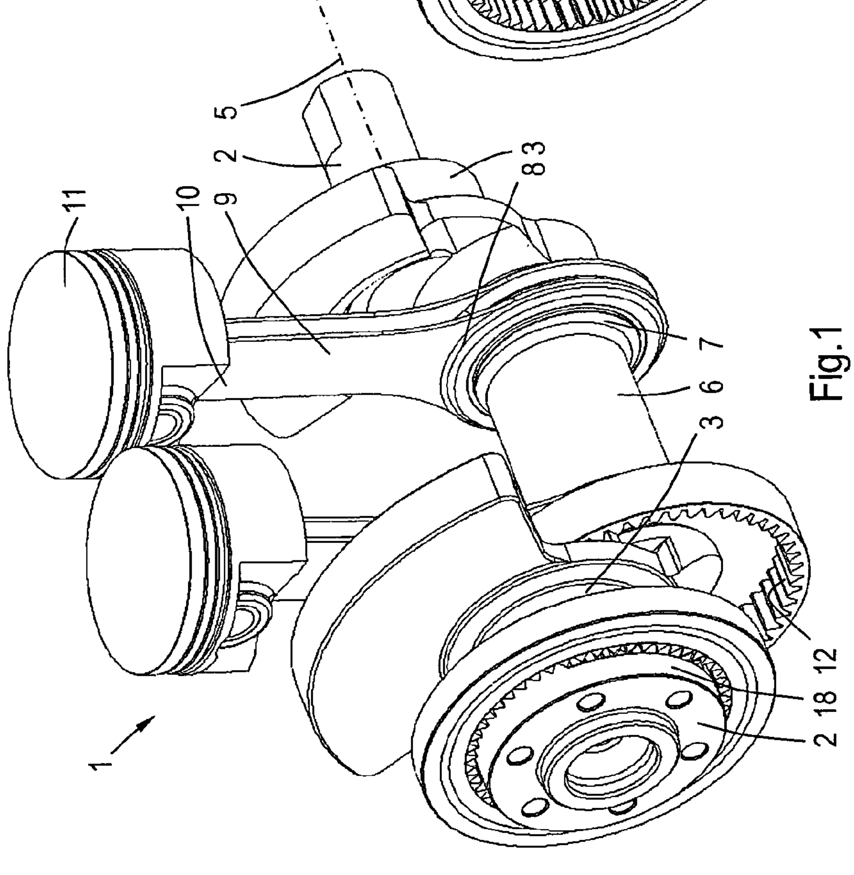
FIG. 1 is a perspective view of an embodiment of a reciprocating piston mechanism according to an aspect of the invention.

FIG. 1-4 show an embodiment of a reciprocating piston mechanism 1 according to an aspect of the invention, which is suitable for an internal combustion engine. The reciprocating piston mechanism 1 comprises a crankcase (not shown), which supports a crankshaft 2 by crankshaft bearings 3. The crankshaft 2 in the embodiment includes a crankpin 4 and is rotatable with respect to the crankcase about a crankshaft axis 5.

Furthermore, the mechanism 1 comprises a crank member 6 which is rotatably mounted on the crankpin 4. The crank member 6 is provided with two bearing portions 7 which are disposed eccentrically with respect to the crankpin 4. Each of the bearing portions 7 has an outer circumferential wall which bears a big end 8 of a connecting rod 9. Thus, the connecting rod 9 is rotatably mounted on the crank member 6 via its big end 8. The connecting rod 9 also includes a small end 10 to which a piston 11 is rotatably connected.

Figure 3:
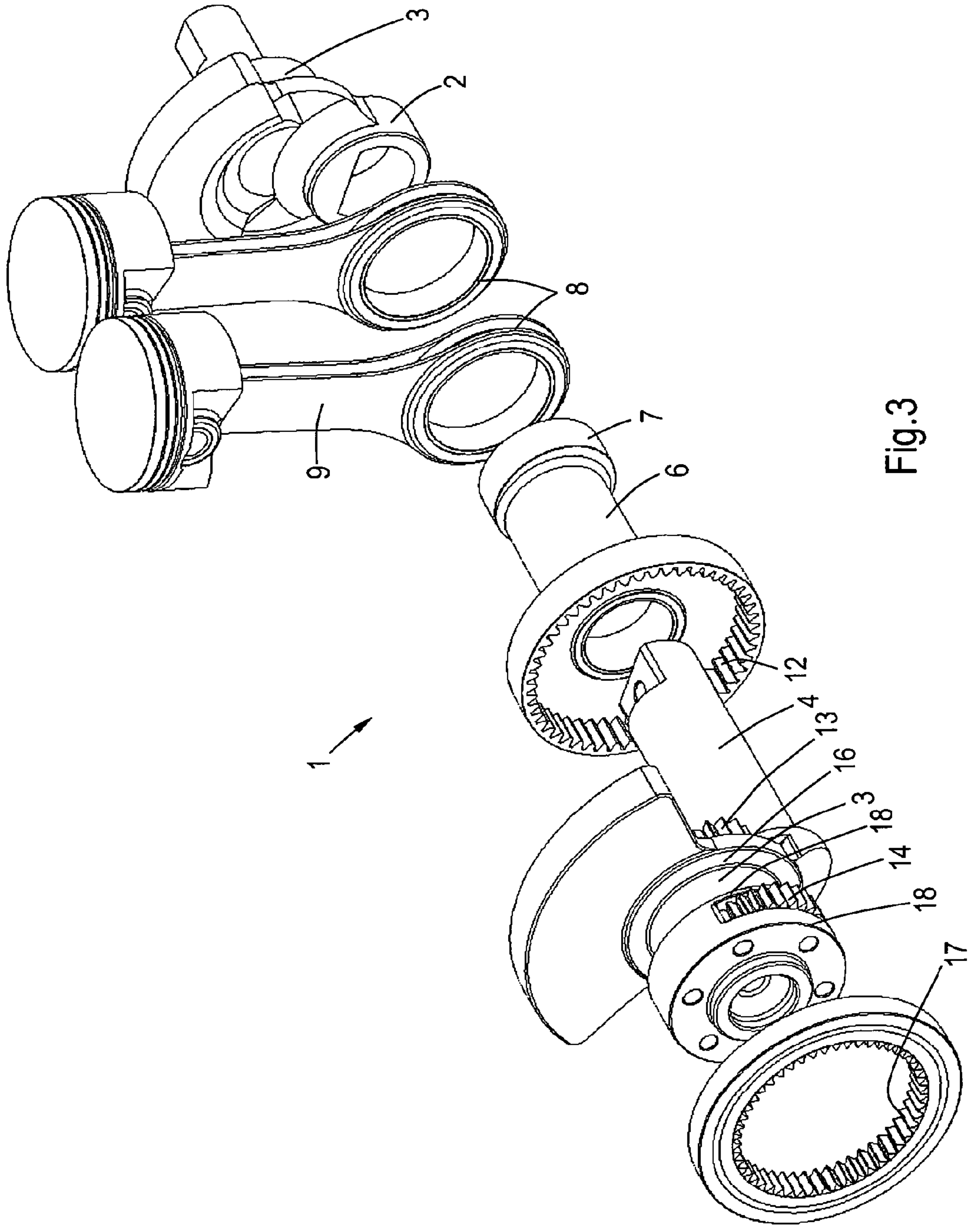
FIG. 3 is a perspective exploded view of the embodiment of FIG. 1 on a smaller scale.

The crank member 6 is provided with a crank member gear 12 which meshes with a first auxiliary gear 13. The first auxiliary gear 13 is fixed to a second auxiliary gear 14 via a common auxiliary shaft 15. The auxiliary shaft 15 is mounted to the crankshaft 2 and is rotatable with respect to the crankshaft 2 about an auxiliary shaft axis which extends parallel to the crankshaft axis 5. This means that the auxiliary shaft axis is spaced from the crankshaft axis 5. In this embodiment the auxiliary shaft 15 extends through a crank arm 16 such that the first auxiliary gear 13 and the second auxiliary gear 14 are disposed at opposite sides of the crank arm 16. In this case the crank arm 16 and a crankshaft bearing 3 are integrated such that the auxiliary shaft 15 extends through both. Thus, the auxiliary shaft 14 extends within an outer circumference of the crankshaft bearing 3. FIG. 3 shows that the first gear 13 is disposed at the side of the crankpin 4 of the crank arm 16.

The second auxiliary gear 14 meshes with a central gear 17 having a center line which coincides with the crankshaft axis 5. In this embodiment the central gear 17 is an internal gear and the second auxiliary gear 14 is an external gear.

According to an aspect of the invention the crank member gear 12 is an internal gear and the first auxiliary gear 13 is an external gear. Due to this configuration the reciprocating piston mechanism 1 can be built in a compact way and is simpler than those known in the art.

As can be seen in FIG. 3 the second auxiliary gear 14 is disposed between two crankshaft portions 18. In this case a sealing ring (not shown) is supported by one of the portions 18 and a flywheel is mounted to a frontal end of the crankshaft 2 near the crankshaft portions 18. It is also conceivable that the crankshaft portions 18 form crankshaft bearing portions, between which the second auxiliary gear 14 is disposed as seen in axial direction of the crankshaft axis 5. In that case one crankshaft bearing 3 is formed by two separate crankshaft bearing portions 18.

Figure 4:
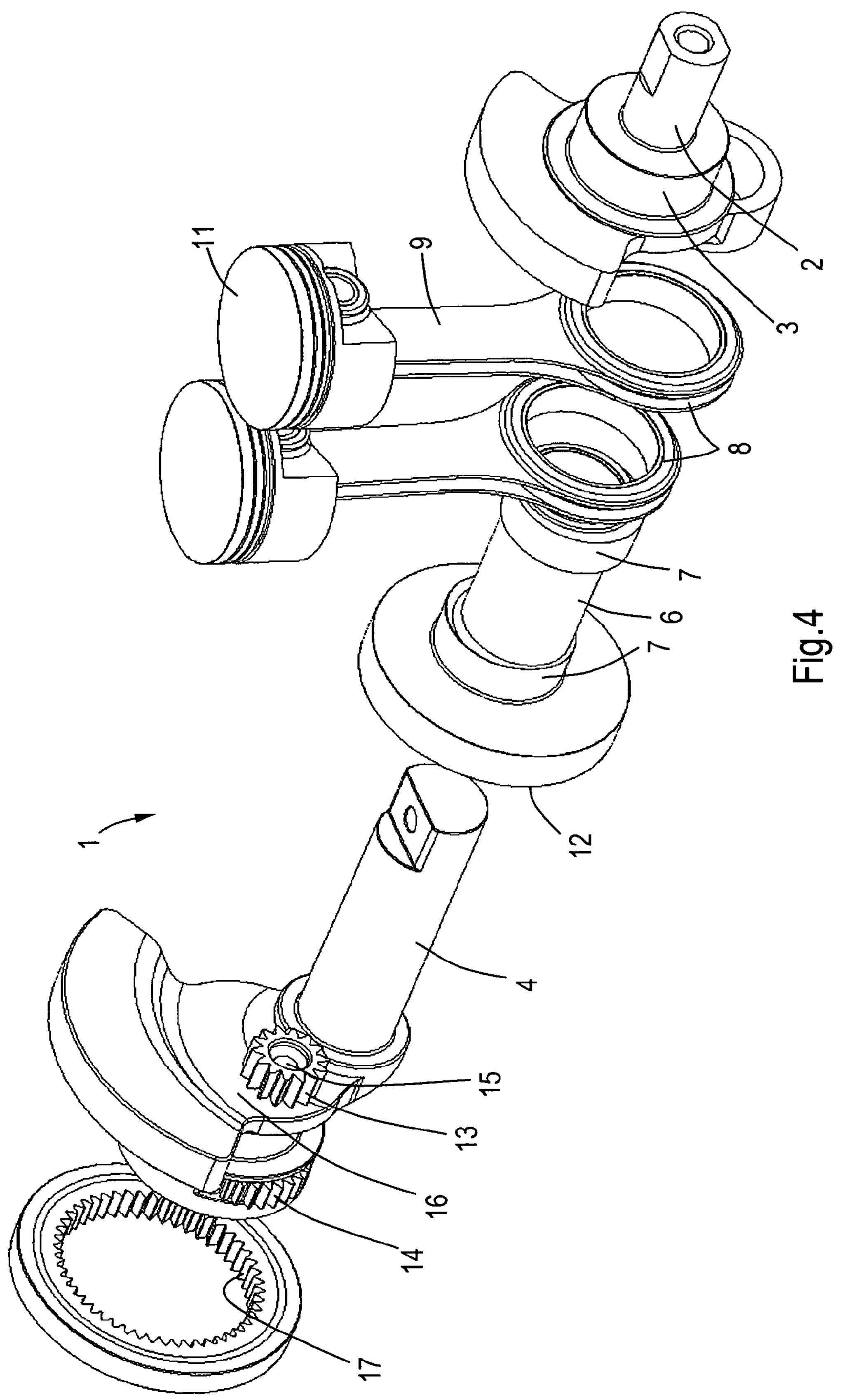
FIG. 4 is a similar view as FIG. 3, but as seen from an opposite side.

The advantage of the configuration as shown in FIG. 1-4 is that the mechanism is compact in axial direction of the crankshaft axis 5, and the crankshaft 2 is symmetric and relatively small between the crankshaft bearings 3. FIG. 3-4 show how the mechanism 1 can be assembled by fixing two parts of the crankshaft to each other. Alternatively, the crankshaft can be made of a single piece, such as disclosed in patent application EP 07102584.5.

Figure 5:
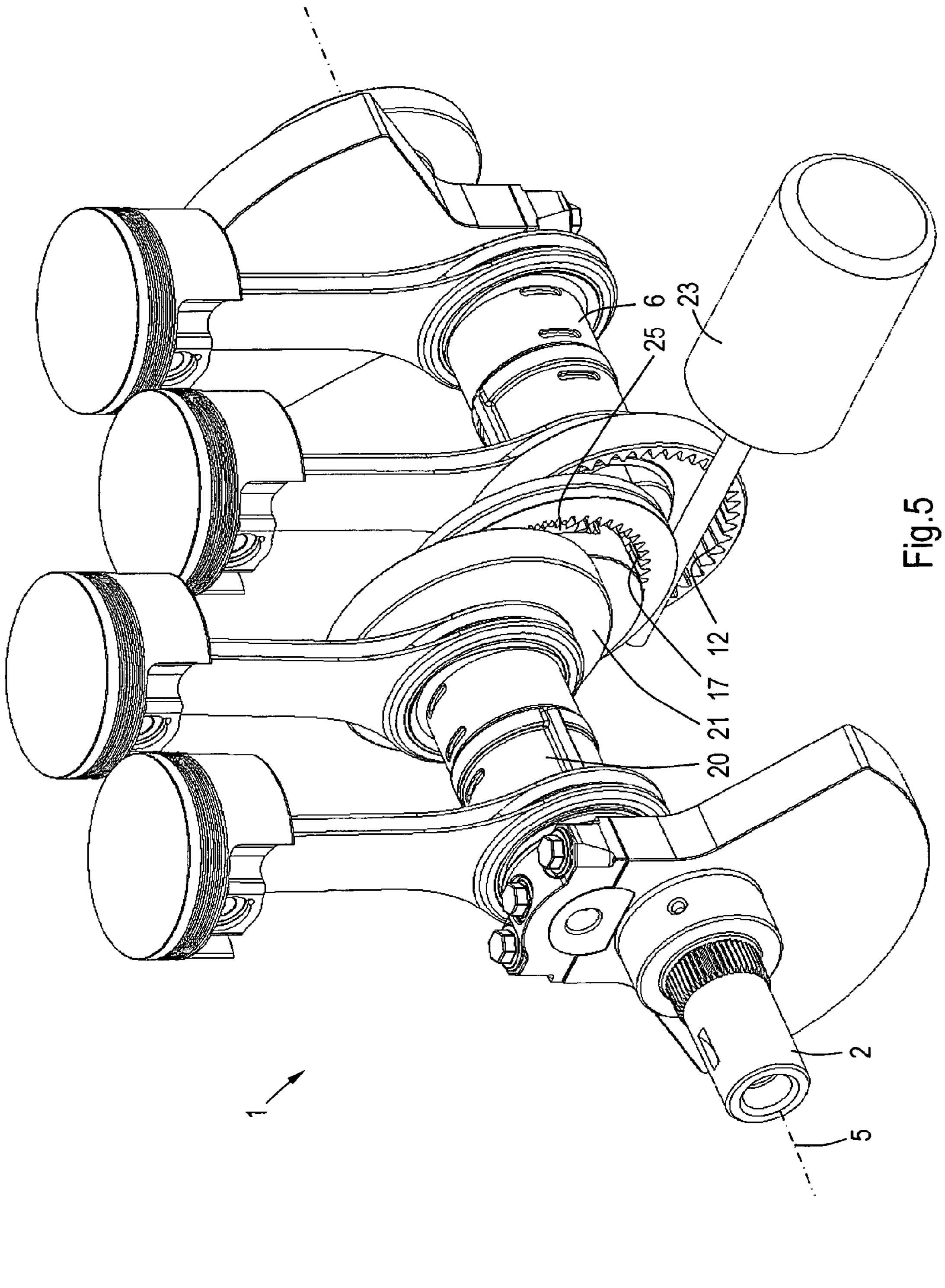
FIG. 5 is a similar view as FIG. 1 of an alternative embodiment.
Figure 6:
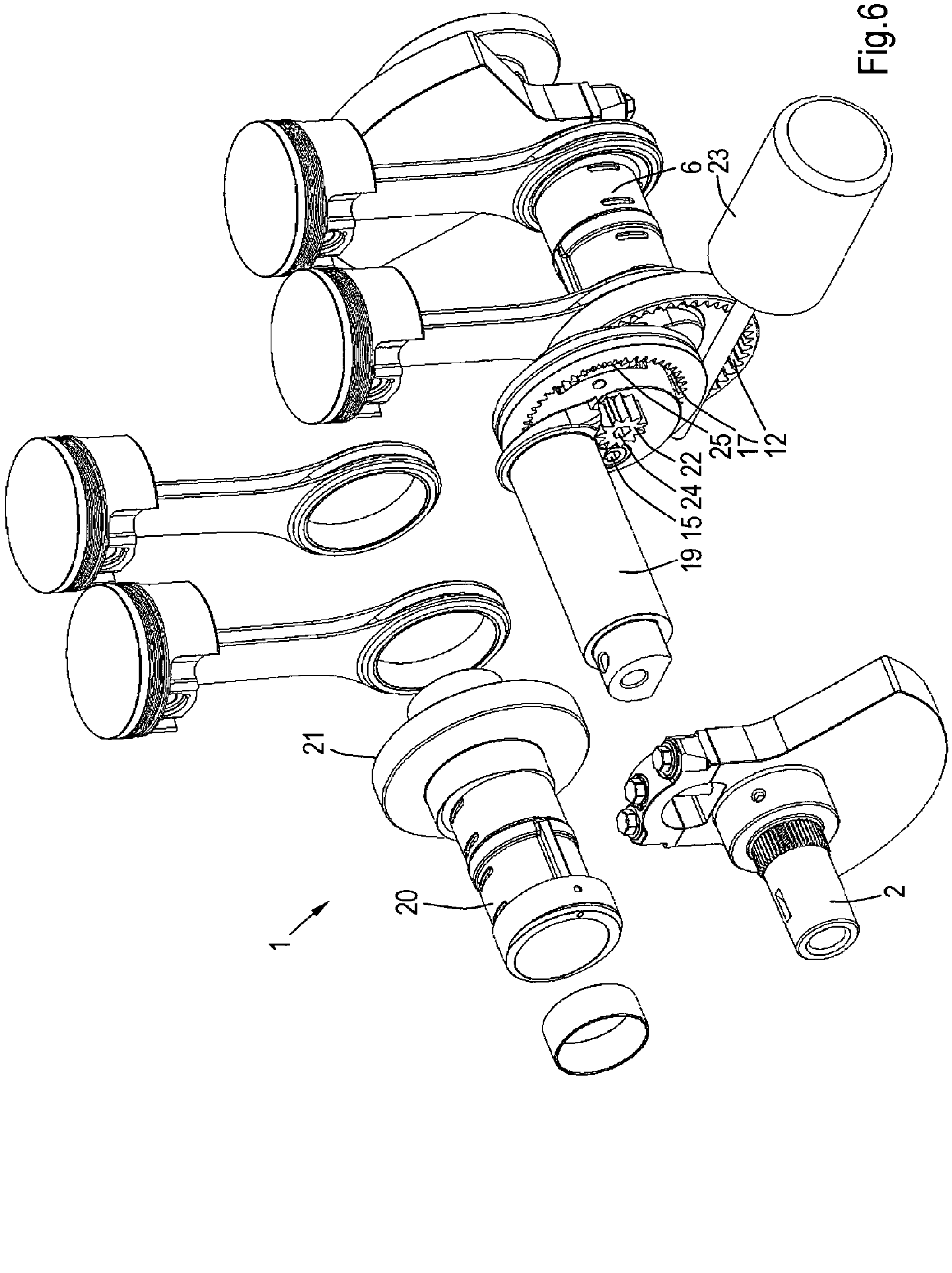
FIG. 6 is a partly exploded view of the embodiment of FIG. 5.
Figure 7:
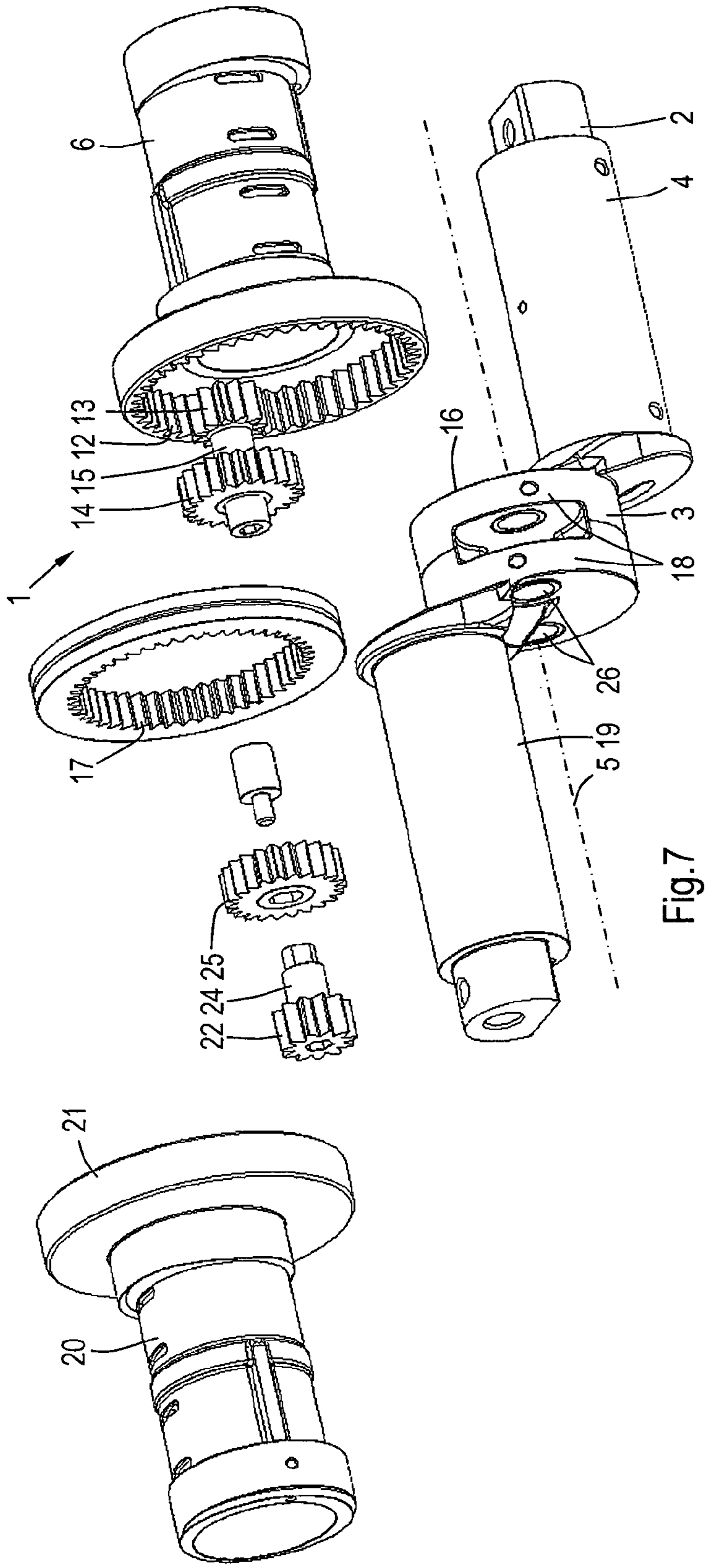
FIG. 7 is a perspective exploded view of a part of the embodiment of FIG. 6.

FIG. 5-7 show an alternative embodiment of the reciprocating piston mechanism 1 according to an aspect of the invention. In this embodiment the crankshaft 2 comprises a second crankpin 19, which is angularly spaced with respect to the crankpin 4 about the crankshaft axis 5. The mechanism 1 further comprises a second crank member 20 comparable to the crank member 6 as described hereinbefore. The second crank member 20 is provided with a second crank member gear 21 which meshes with a third auxiliary gear 22.

In this embodiment the third auxiliary gear 22 is fixed to a second auxiliary shaft 24 (not visible in FIG. 5), to which auxiliary shaft 24 a fourth auxiliary gear 25 is fixed, as well.

The second auxiliary gear 14 and the fourth auxiliary gear 25 both mesh with the central gear 17 and engage therewith at locations spaced from each other in circumferential direction of the central gear 17. The second auxiliary shaft 24 is mounted to the crankshaft 2 and rotatable with respect to the crankshaft 2 about a second auxiliary shaft axis. Both the auxiliary shaft axis and the second auxiliary shaft axis extend parallel to the crankshaft axis 5 and within an outer circumference of the crankshaft bearing 3, which in this case comprises two crankshaft portions as seen along the crankshaft axis 5. The auxiliary shaft 15 and the second auxiliary shaft 24 fit in respective holes 26 in the crank arm 16 at the crankshaft bearing 3, see FIG. 7.

FIG. 5-7 show that the mentioned gears form driving means for driving both the crank member 6 and the second crank member 20, wherein the driving means are located at the center of the reciprocating piston mechanism 1 as seen along the crankshaft axis 5. In case of a four-cylinder internal combustion engine comprising such a mechanism 1, this means that no parts of the driving means need to be located at the axial ends of the crankshaft 2. Furthermore, no separate driving means is necessary for driving the central gear 17 at a certain rotation frequency. It is also noted that counterweights are omitted near the center of the crankshaft 2 as seen along the crankshaft axis 5.

Figure 15:
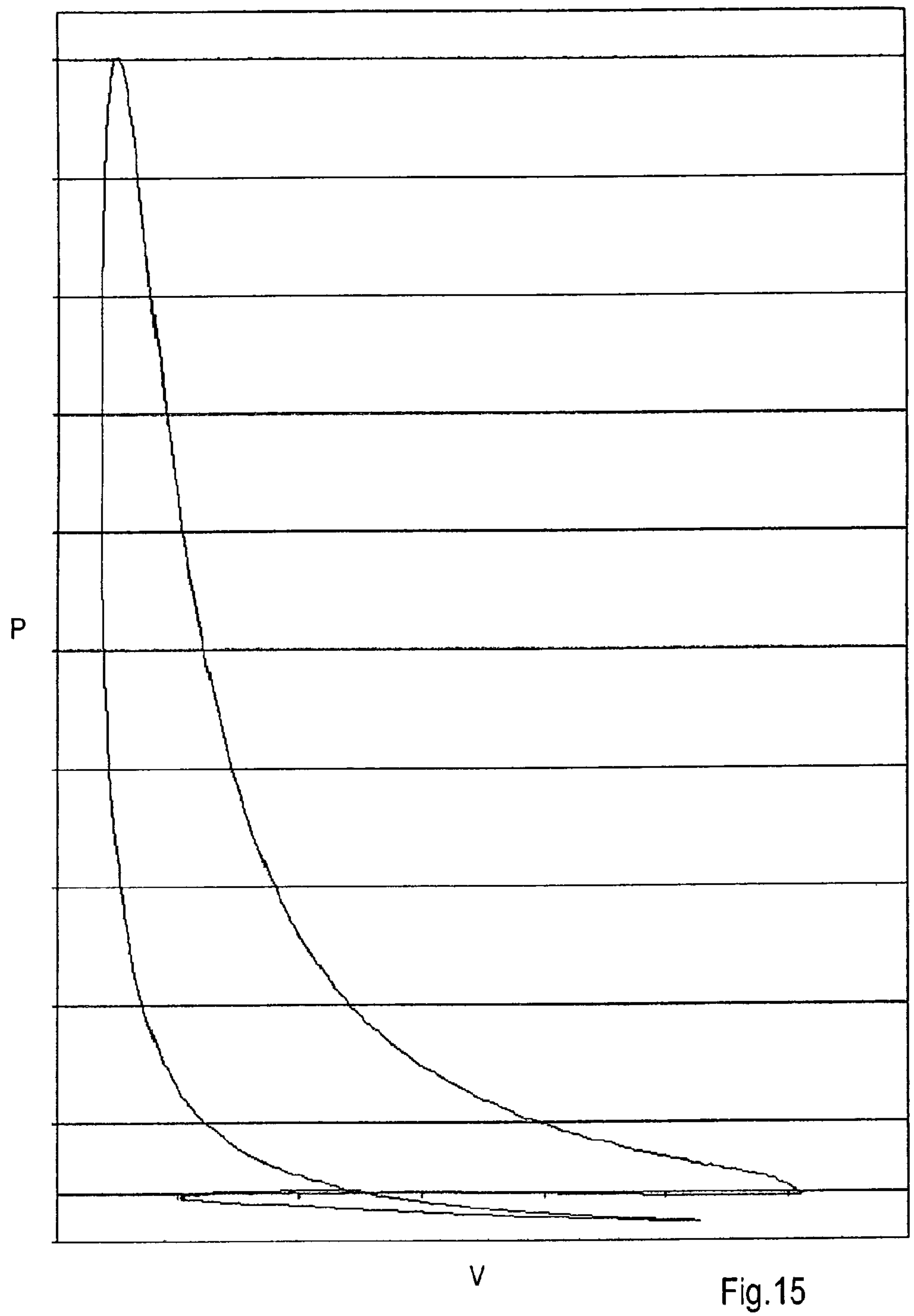
FIG. 15 is a pressure-volume diagram of a cycle of an internal combustion engine provided with the mechanism according to an aspect of the invention.

In the embodiment as shown in FIG. 5-7 the central gear 17 is rotatably mounted in the crankcase and drivable by a driving mechanism for turning the central gear 17 within a predetermined angle, for example by an electric motor 23 via a transmission. This feature provides the opportunity of creating a relatively high rate of internal EGR in a four-stroke internal combustion engine if the mechanism 1 is applied therein. The central gear 17 can be angularly positioned with respect to the crankcase such that in top dead center of the piston 11 the maximum eccentricity is angled with respect to a first plane extending through the crankshaft axis 5 and a center line of the crankpin 4, and with respect to a second plane extending perpendicular to the first plane and parallel to the crankshaft axis 5. In other words, when the piston 11 is in top dead center, the maximum eccentricity of the crank member 6 is angled between 0 and 90 degrees with respect to the upward position of the associated crankpin 4, and is thus neither exactly aligned with the crank arm nor at an angle of 90 degrees thereto. FIG. 15 shows a pressure (P)-volume (V) diagram of a cycle of such an internal combustion engine, wherein the central gear 17 is turned to a position as described. At the end of the compression stroke the top dead center of the piston 11 is higher than at the end of the exhaust stroke, whereas its bottom dead center at the end of the expansion stroke is lower than that at the end of the inlet stroke. This means that the engine in this case combines a long expansion stroke with a short exhaust stroke. In particular, the short exhaust stroke leads to a relative high rate of internal EGR which is advantageous under certain engine conditions.

Figure 8:
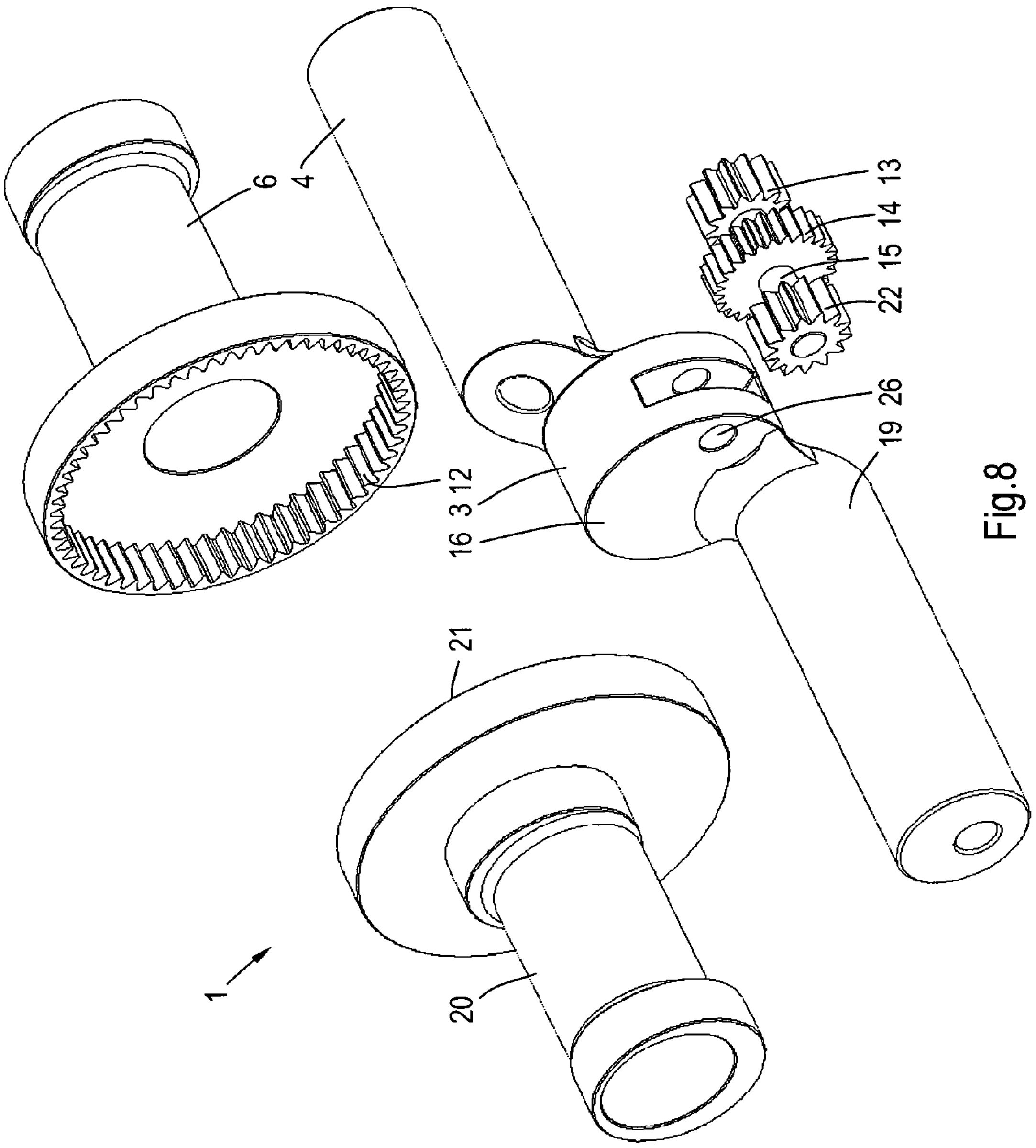
FIG. 8 is a similar view as FIG. 7 of an alternative embodiment.

FIG. 8 shows a part of another alternative embodiment of the reciprocating piston mechanism 1 according to an aspect of the invention. In this embodiment the third auxiliary gear 22 is fixed to the auxiliary shaft 15, to which auxiliary shaft 15 the first and second auxiliary gears 13, 14 are fixed, as well. FIG. 8 also shows that the crank arm 16 has a single hole 26 for receiving the auxiliary shaft 15. It can be seen that the auxiliary shaft 15 extends within the outer circumference of the crankshaft bearing 3, resulting in a compact structure. Thus in assembled condition three pairs of gear combinations are present behind each other as seen along the crankshaft axis 5: the crank member gear 12 meshing with the auxiliary gear 13, the central gear 17 (not shown in FIG. 8) meshing with the second auxiliary gear 14, and the third auxiliary gear 22 meshing with the second crank member gear 21. Thus, when the embodiment as shown in FIG. 5-7 is modified such that the auxiliary shaft axis and the second auxiliary shaft axis coincide, and the fourth auxiliary gear 25 is integrated in the second auxiliary gear 14, the embodiment as shown in FIG. 8 is obtained.

Figure 10:
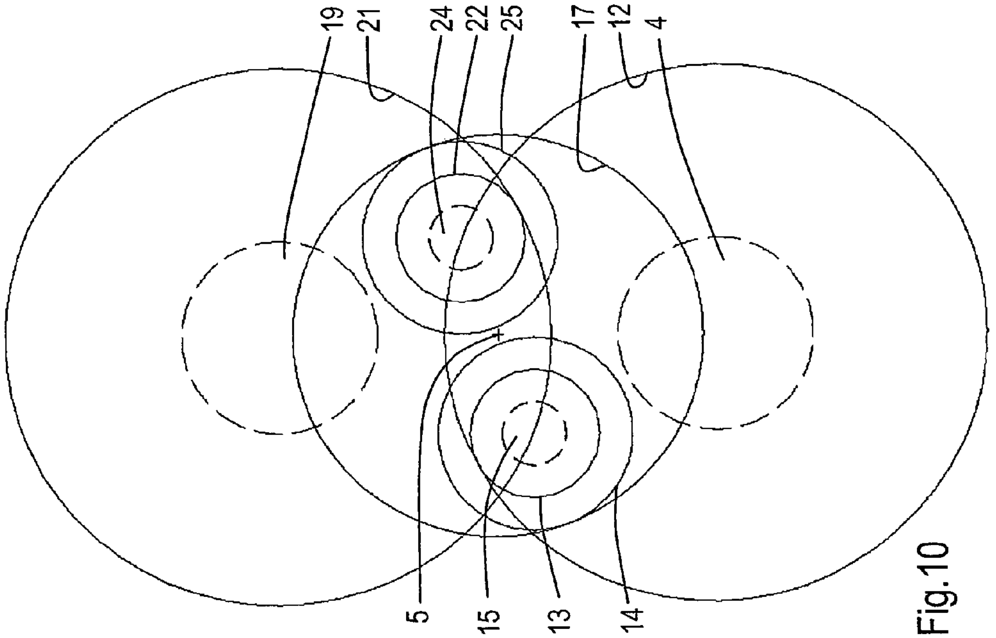
FIG. 10 is similar to FIG. 9, but illustrating the embodiment of FIG. 5-7.
Figure 9:
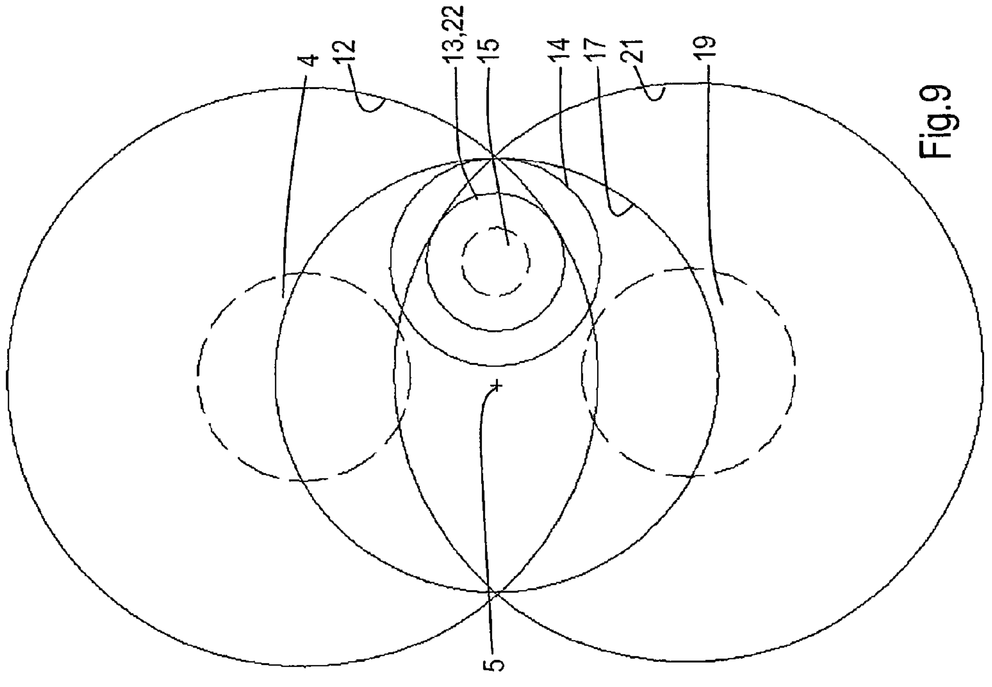
FIG. 9 is a very schematic cross-sectional view of the embodiment of FIG. 8 on enlarged scale, illustrating the principle of the meshing gears.

The way in which the different gears mesh with each other is illustrated in FIG. 9 related to the embodiment as shown in FIG. 8, and in FIG. 10 related to the embodiment as shown in FIG. 5-7. FIG. 10 shows that both the second auxiliary gear 14 and the fourth auxiliary gear 25 mesh with the central gear 17, whereas FIG. 9 shows that only the second auxiliary gear 14 meshes with the central gear 17. In the case of a single auxiliary shaft 15 as shown in FIG. 9, the auxiliary shaft 15 must be positioned such that the first auxiliary gear 13 and the third auxiliary gear 22 mesh with the crank member gear 12 and the second crank member gear 21, respectively. At the same time, the second auxiliary gear 14 has to mesh with the central gear 17, which means that the positions as well as the dimensions of the different gears must be selected accurately in order to obtain a desired rotation frequency of the crank member 6 and the second crank member 20 with respect to the crankshaft 2.

Figure 11:
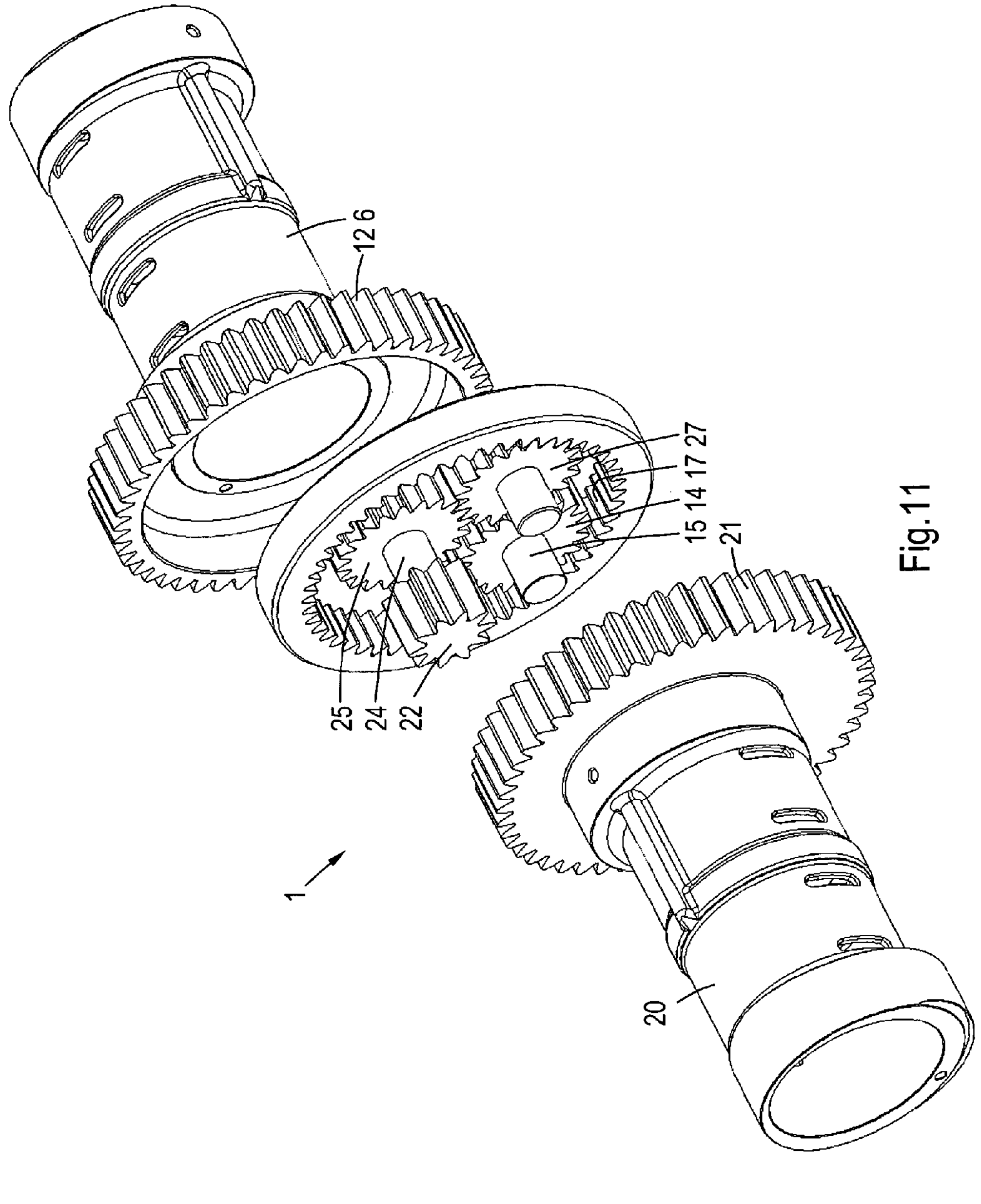
FIG. 11 is a perspective view of an alternative embodiment of a reciprocating piston mechanism according to an aspect of the invention.

FIG. 11 shows an alternative embodiment of the mechanism 1 according to an aspect of the invention. In this embodiment the crank member gear 12 is an external gear meshing with the first auxiliary gear 13 (not visible in FIG. 11). The first auxiliary gear 13 is fixed to the second auxiliary gear 14 via the auxiliary shaft 15. In this case the second auxiliary gear 14 does not mesh with the central gear 17, but it meshes with an intermediate auxiliary gear 27. The intermediate auxiliary gear 27 serves to direct the rotational direction of the crank member 6 and the second crank member 20 in the same rotational direction as the crankshaft 2. Basically, its dimension is not relevant, but it preferably fits within the central gear 17 together with the other gears 14, 25. The intermediate auxiliary gear 27 meshes with the central gear 17. In the same way, the second crank member gear 21 is an external gear which meshes with the third auxiliary gear 22. The third auxiliary gear 22 and the fourth auxiliary gear 25 are fixed to the second auxiliary shaft 24. Again the auxiliary shaft axis and the second auxiliary shaft axis extend parallel to the crankshaft axis 5 and preferably extend within an outer circumference of a crankshaft bearing (not shown). The gear dimensions can be selected such that the crank member 6 and the second crank member 20 rotate in the same direction as the crankshaft 2 and at half speed thereof. The gear ratio between the central gear 17 and the second auxiliary gear 14 may be half as high as the gear ratio between the crank member gear 12 and the first auxiliary gear 13. This condition may be achieved by a certain choice of diameters and gear teeth modulus.

Figure 12:
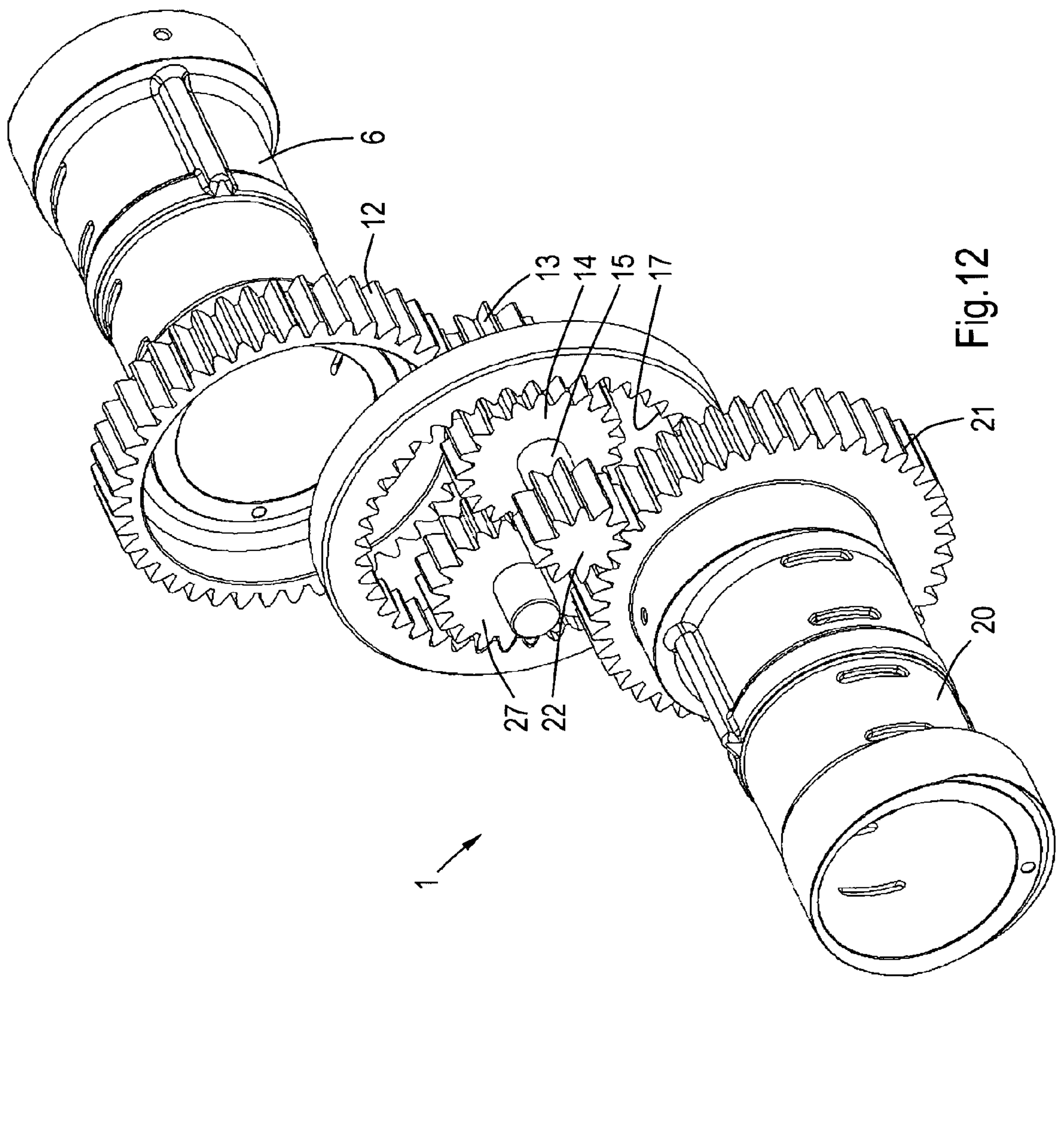
FIG. 12 is a similar view as FIG. 11, but showing another alternative embodiment.

FIG. 12 shows another alternative embodiment, wherein the second and fourth auxiliary gears 14, 25 of the embodiment as shown in FIG. 11 are integrated in the second auxiliary gear 14. The first auxiliary gear 13, second auxiliary gear 14 and the third auxiliary gear 22 are fixed on the auxiliary shaft 15. The second auxiliary gear 14 meshes with the intermediate auxiliary gear 27, which on its turn meshes with the central gear 17.

It is noted that the mechanism according to FIGS. 11 and 12 can be applied for a two-cylinder reciprocating piston mechanism 1 as shown in FIG. 1-4, as well. Due to the external gears of the crank member 12 and the second crank member 21, helical gears may be preferred for minimizing noise.

Figure 14:
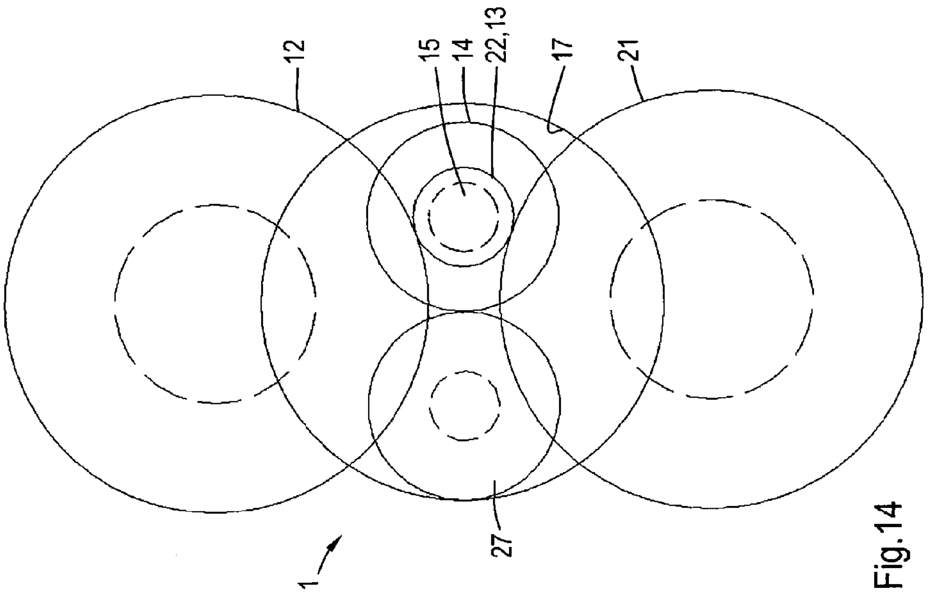
FIG. 14 is similar to FIG. 13, but illustrating the embodiment of FIG. 12.
Figure 13:
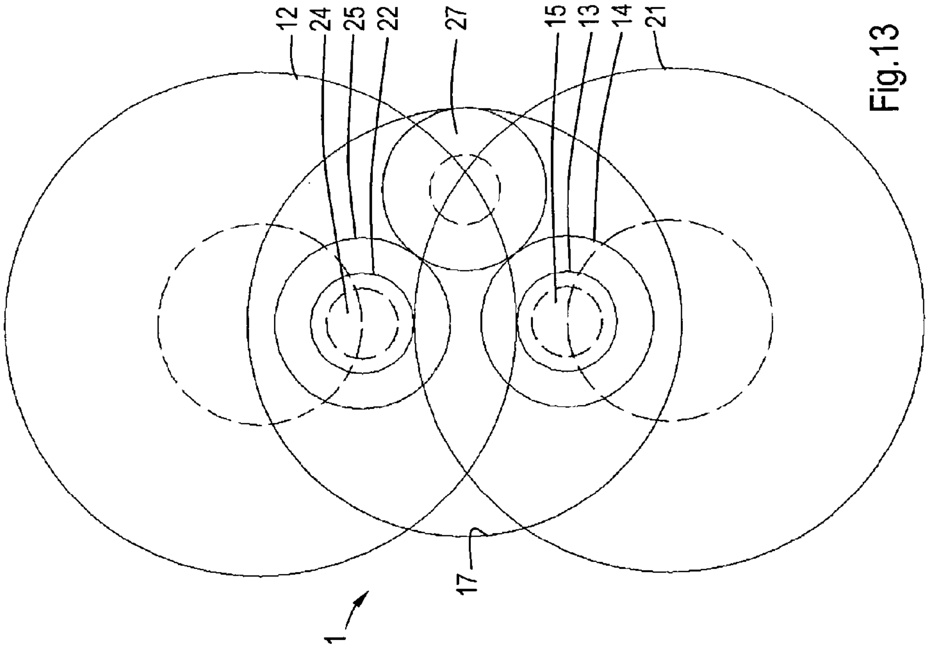
FIG. 13 is a very schematic cross-sectional view of the embodiment of FIG. 11 on enlarged scale, illustrating the principle of the meshing gears.

FIGS. 13 and 14 illustrate the way in which the different gears mesh with each other in the embodiment as shown in FIGS. 11 and 12, respectively. FIG. 13 shows that only the intermediate auxiliary gear 27 meshes with the central gear 17, whereas the first auxiliary gear 13 meshes with the crank member gear 12, and the second auxiliary gear 14 fixed to the auxiliary shaft 15 meshes with the intermediate auxiliary gear 27. Similarly, the third auxiliary gear 22 meshes with the second gear member 21, and the fourth auxiliary gear 25 meshes with the intermediate auxiliary gear 27.

FIG. 14 illustrates the embodiment in which the intermediate auxiliary gear 27 meshes with the central gear 17 on the one hand and with the second auxiliary gear 14 on the other hand. The second auxiliary gear 14, the first auxiliary gear 13, and the third auxiliary gear 22 are fixed to the single auxiliary shaft 15, whereas the first auxiliary gear 13 and the third auxiliary gear 22 mesh with the crank member gear 12 and the second crank member gear 21, respectively.

Figure 16:
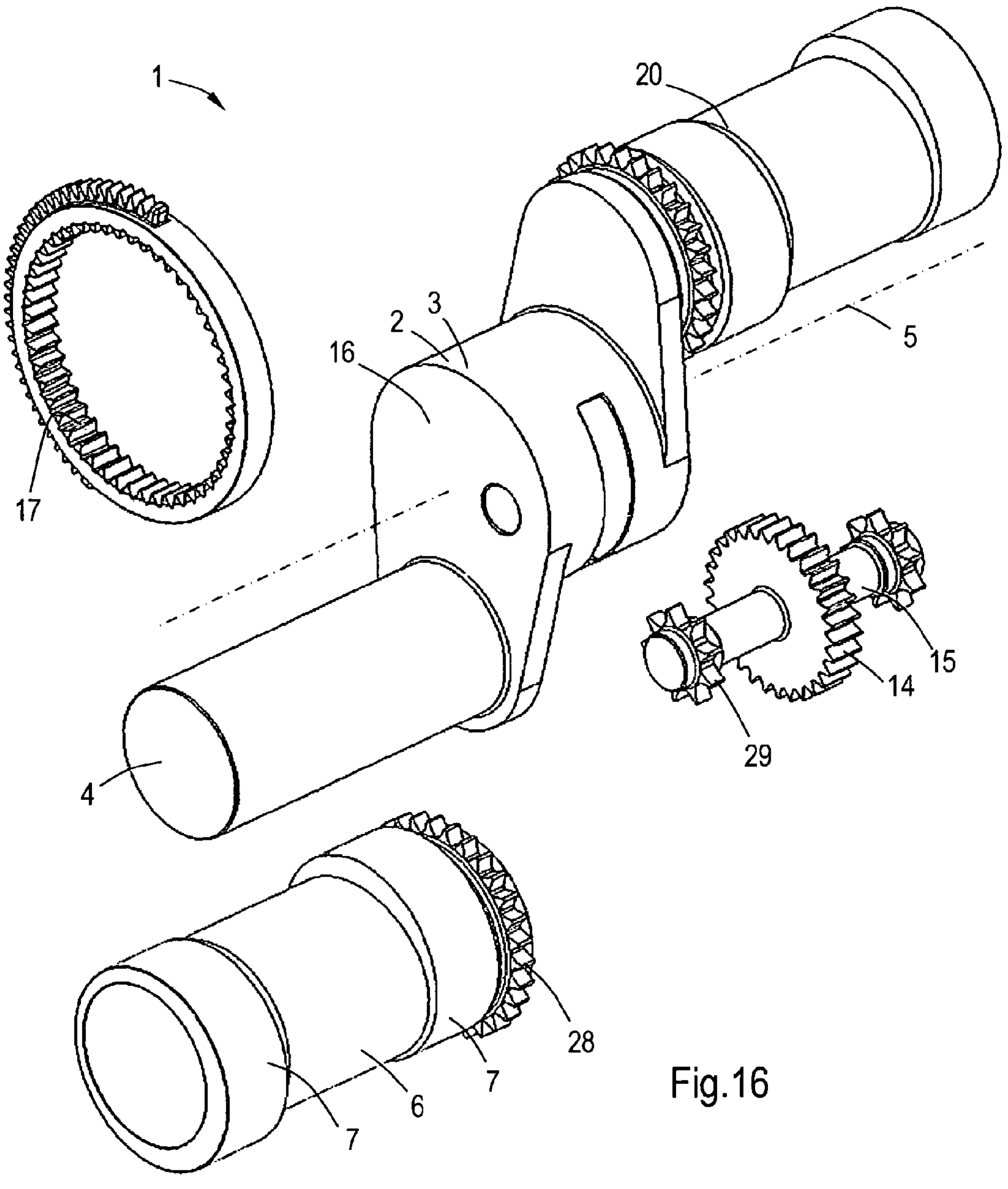
FIG. 16 is a perspective and partly exploded view of an alternative embodiment of a reciprocating piston mechanism according to an aspect of the invention.
Figure 17:
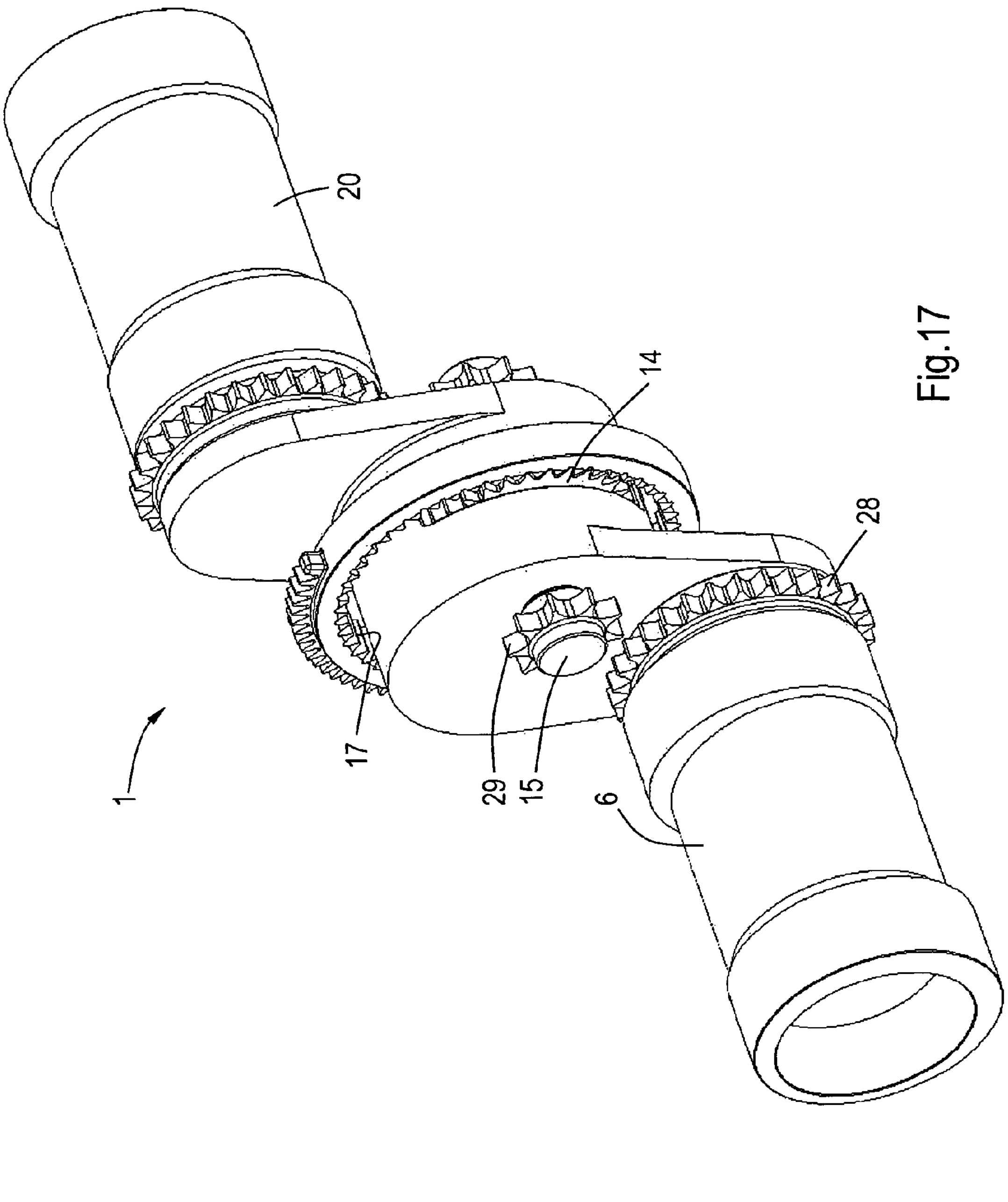
FIG. 17 is a similar view as FIG. 16 on a larger scale, but showing the embodiment in assembled condition.
Figure 18:
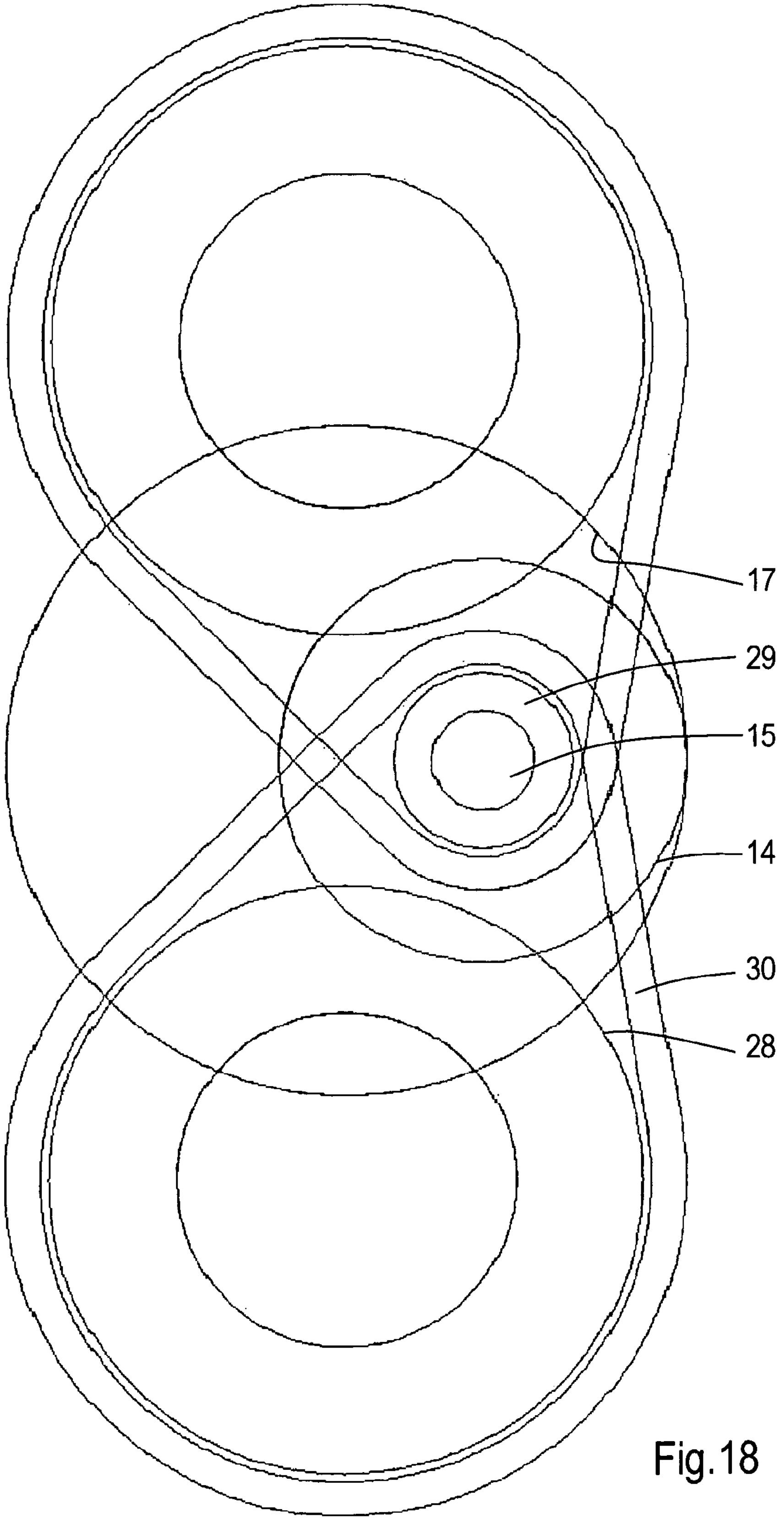
FIG. 18 is a schematic side view of the embodiment of FIGS. 16-17.

FIGS. 16-18 show an alternative embodiment of the reciprocating piston mechanism 1 according to an aspect of the invention. Similar to the embodiments as described hereinbefore, the crank member 6 is drivably connected to the auxiliary shaft 15 via a first transmission. In this case the first transmission comprises a crank member sprocket wheel 28 which is mounted to the crank member 6, an auxiliary shaft sprocket wheel 29 which is mounted to the auxiliary shaft 15, and a chain 30 which drivably connects the first and second sprocket wheels 28, 29 to each other. The auxiliary shaft 15 is mounted to the crankshaft 2 and rotatable with respect thereto about an auxiliary shaft axis extending parallel to the crankshaft axis 5. Similar to the embodiments as described hereinbefore the auxiliary shaft 15 is also drivably connected to the central ring or central gear 17 via a second transmission. In this case the second transmission comprises the second auxiliary gear 14 which is an external gear and mounted to the auxiliary shaft 15. The second auxiliary gear 14 meshes with the internal gear of the central gear 17. The central gear 17 has a center line which coincides with the crankshaft axis 5. The central gear 17 also has an external gear for adjusting its position with respect to the crankcase, but similar to the other embodiments as described hereinbefore, the first and second transmissions are adapted such that the crank member 6 rotates at a rotation frequency with respect to the crankcase which is substantially half of that of the crankshaft 2 when the central gear 17 has a fixed position with respect to the crankcase. The crank member 6 and the crankshaft 2 have the same direction of rotation.

The mechanism in the embodiments as illustrated in FIGS. 16-18 differ from the embodiments as illustrated in FIGS. 1-10 in that the first transmission comprises sprocket wheels 28, 29 which are drivably connected to each other through a chain 30 instead of an internal gear 12 and an external gear 13 meshing with each other. In terms of costs, manufacturing a sprocket wheel 28 is less expensive than manufacturing an internal crank member gear 12.

The mechanism in the embodiments as illustrated in FIGS. 16-18 differ from the embodiment as illustrated in FIGS. 11-14 in that the first transmission comprises the sprocket wheels 28, 29 and the chain 30 instead of an external gear 12 of the crank member 6 and an external first auxiliary gear 13 meshing with each other, and in that the second transmission comprises the external second auxiliary gear 14 and the internal gear of the central gear 17 instead of the external second auxiliary gear 14 and the intermediate auxiliary gear 27 which meshes both with the second auxiliary gear 14 and the internal gear of the central gear 17. This means that with the mechanism as illustrated in FIGS. 16-18 the same ratio of rotation speed between the crank member 6 and the crankshaft 2 can be achieved as with the embodiment as illustrated in FIGS. 11-14 without the necessity of the intermediate auxiliary gear 27.

It is noted that combinations of different features of the embodiments as described hereinbefore may be combined.

Furthermore, it is noted that the embodiments of the mechanisms as described hereinbefore can be applied such that the bearing portion of the crank member is not eccentrically disposed with respect to the crankpin, but wherein the bearing portion has a circular cross-section. This configuration is similar to that of a conventional reciprocating piston mechanism, but the crank member, which is disposed between the crank pin and the big end, is rotated with respect to the crankshaft. It has surprisingly been found that internal friction of the total mechanism is reduced due to the fact that friction reduction at the big end/crank member/crankpin outweighs friction increase due to the first and second transmissions. In this case it is not necessary that the first and second transmissions are adapted such that the crank member rotates at a rotation frequency with respect to the crankcase which is substantially half of that of the crankshaft when the central ring has a fixed position with respect to the crankcase. The ratio may be different from a half.

From the foregoing, it will be clear that aspects of the invention provides a relatively simple reciprocating piston mechanism which offers the possibility of designing a compact embodiment of the mechanism.

The invention is not limited to the embodiments shown in the drawings and described hereinbefore, which may be varied in different manners within the scope of the claims and their technical equivalents. For example, the central gear and the second and fourth gear may have different gear configurations than shown in the above embodiments. Furthermore, the central gear may be driven at a certain rotation frequency. The mechanism may be applied for crankshafts having more than two crankpins.

The invention claimed is:

1. A reciprocating piston mechanism comprising a crankcase;

a crankshaft having at least a crankpin, said crankshaft being supported by the crankcase and rotatable with respect thereto about a crankshaft axis;

at least a connecting rod including a big end and a small end;

a piston being rotatably connected to the small end;

a crank member being rotatably mounted on the crankpin, and comprising at least a bearing portion which is eccentrically disposed with respect to the crankpin, and having an outer circumferential wall which bears the big end of the connecting rod such that the connecting rod is rotatably mounted on the bearing portion of the crank member via the big end;

wherein the crank member is provided with a crank member gear which meshes with a first auxiliary gear being an external gear, wherein the first auxiliary gear is fixed to a second auxiliary gear via a common auxiliary shaft, which auxiliary shaft is mounted to the crankshaft, wherein the crankshaft is provided with a crankshaft bearing and the auxiliary shaft extends within the outer circumference of the crankshaft bearing, and wherein an auxiliary shaft axis is spaced apart from the crankshaft axis and is configured to rotate about the crankshaft axis, which second auxiliary gear meshes with a central gear having a center line which coincides with the crankshaft axis; and wherein the crank member gear is an internal gear.

2. The reciprocating piston mechanism according to claim 1, wherein the second auxiliary gear is an external gear and the central gear is an internal gear.

3. The reciprocating piston mechanism according to claim 1, wherein the auxiliary shaft extends through a crank arm of the crankshaft and the first and second auxiliary gears are disposed at opposite sides of the crank arm.

4. The reciprocating piston mechanism according to claim 1, wherein the second auxiliary gear is disposed adjacent to at least a crankshaft bearing portion as seen in axial direction of the crankshaft axis.

5. The reciprocating piston mechanism according to claim 1, wherein the second auxiliary gear is disposed between two crankshaft bearing portions as seen in axial direction of the crankshaft axis.

6. The reciprocating piston mechanism according to claim 1, wherein the central gear is rotatably mounted in the crankcase.

7. The reciprocating piston mechanism according to claim 6, wherein the central gear is drivable by a driving mechanism.

8. The reciprocating piston mechanism according to claim 1, wherein the central gear is angularly positioned with respect to the crankcase such that in top dead center of the piston the maximum eccentricity is angled with respect to a first plane extending through the crankshaft axis and a center line of the crankpin, and with respect to a second plane extending perpendicular to the first plane and parallel to the crankshaft axis.

9. A reciprocating piston mechanism comprising a crankcase;

a crankshaft having at least a crankpin, said crankshaft being supported by the crankcase and rotatable with respect thereto about a crankshaft axis;

at least a connecting rod including a big end and a small end;

a piston being rotatably connected to the small end;

a crank member being rotatably mounted on the crankpin, and comprising at least a bearing portion which is eccentrically disposed with respect to the crankpin, and having an outer circumferential wall which bears the big end of the connecting rod such that the connecting rod is rotatably mounted on the bearing portion of the crank member via the big end;

wherein the crank member is provided with a crank member gear which meshes with a first auxiliary gear being an external gear, wherein the first auxiliary gear is fixed to a second auxiliary gear via a common auxiliary shaft, which auxiliary shaft is mounted to the crankshaft, wherein an auxiliary shaft axis is spaced apart from the crankshaft axis and is configured to rotate about the crankshaft axis, which second auxiliary gear meshes with a central gear having a center line which coincides with the crankshaft axis; and wherein the crank member gear is an internal gear; and wherein the crankshaft comprises at least a second crankpin which is angularly spaced with respect to the crankpin about the crankshaft axis, and at least a second crank member rotatably mounted on the second crank pin, wherein the second crank member is provided with a second crank member gear being an internal gear which meshes with a third auxiliary gear being an external gear, wherein the third auxiliary gear is fixed to a fourth auxiliary gear via a common second auxiliary shaft, which second auxiliary shaft is mounted to the crankshaft wherein a second auxiliary shaft axis is spaced apart from the crankshaft axis and is configured to rotate about the crankshaft axis, which fourth auxiliary gear meshes with the central gear.

10. The reciprocating piston mechanism according to claim 9, wherein the crankshaft is provided with a crankshaft bearing between the crankpin and the second crankpin as seen along the crankshaft axis, and wherein the auxiliary shaft and the second auxiliary shaft extend within the outer circumference of the crankshaft bearing.

11. The reciprocating piston mechanism according to claim 9, wherein the mechanism is configured such that the fourth auxiliary gear is integrated in the second auxiliary gear, and the second auxiliary shaft is integrated in the auxiliary shaft such that the auxiliary shaft axis and the second auxiliary shaft axis coincide.

12. The reciprocating piston mechanism according to claim 11, wherein the crankshaft is provided with a crankshaft bearing between the crankpin and the second crankpin as seen along the crankshaft axis and the auxiliary shaft extends within the outer circumference of the crankshaft bearing.

13. A reciprocating piston mechanism comprising a crankcase;

a crankshaft having at least a crankpin, said crankshaft being supported by the crankcase and rotatable with respect thereto about a crankshaft axis;

at least a connecting rod including a big end and a small end;

a piston being rotatably connected to the small end;

a crank member being rotatably mounted on the crankpin, and comprising at least a bearing portion which is eccentrically disposed with respect to the crankpin, and having an outer circumferential wall which bears the big end of the connecting rod such that the connecting rod is rotatably mounted on the bearing portion of the crank member via the big end;

wherein the crank member is provided with a crank member gear, being an external gear, which meshes with a first auxiliary gear being an external gear, wherein the first auxiliary gear is fixed to a second auxiliary gear, being an external gear, via a common auxiliary shaft, which auxiliary shaft is mounted to the crankshaft, wherein an auxiliary shaft axis is spaced apart from the crankshaft axis and is configured to rotate about the crankshaft axis, which second auxiliary gear meshes with an intermediate auxiliary gear, being an external gear, which intermediate auxiliary gear also meshes with a central gear, being an internal gear, having a center line which coincides with the crankshaft axis.

14. The reciprocating piston mechanism according to claim 13, wherein the crankshaft is provided with a crankshaft bearing and the auxiliary shaft extends within the outer circumference of the crankshaft bearing.

15. The reciprocating piston mechanism according to claim 13, wherein the crankshaft comprises at least a second crankpin which is angularly spaced with respect to the crankpin about the crankshaft axis, and at least a second crank member rotatably mounted on the second crank pin, wherein the second crank member is provided with a second crank member gear being an external gear which meshes with a third auxiliary gear being an external gear, wherein the third auxiliary gear is fixed to a fourth auxiliary gear via a common second auxiliary shaft, which second auxiliary shaft is mounted to the crankshaft wherein a second auxiliary shaft axis is spaced apart from the crankshaft axis and is configured to rotate about the crankshaft axis, which fourth auxiliary gear meshes with the central gear.

16. The reciprocating piston mechanism according to claim 15, wherein the crankshaft is provided with a crankshaft bearing between the crankpin and the second crankpin as seen along the crankshaft axis, and wherein the auxiliary shaft and the second auxiliary shaft extend within the outer circumference of the crankshaft bearing.

17. The reciprocating piston mechanism according to claim 15, wherein the mechanism is configured such that the fourth auxiliary gear is integrated in the second auxiliary gear, and the second auxiliary shaft is integrated in the auxiliary shaft such that the auxiliary shaft axis and the second auxiliary shaft axis coincide.

18. The reciprocating piston mechanism according to claim 17, wherein the crankshaft is provided with a crankshaft bearing between the crankpin and the second crankpin as seen along the crankshaft axis, and the auxiliary shaft extends within the outer circumference of the crankshaft bearing.

19. A reciprocating piston mechanism comprising a crankcase;

a crankshaft having at least a crankpin, said crankshaft being supported by the crankcase and rotatable with respect thereto about a crankshaft axis;

at least a connecting rod including a big end and a small end;

a piston being rotatably connected to the small end;

a crank member being rotatably mounted on the crankpin, and comprising at least a bearing portion which is eccentrically disposed with respect to the crankpin, and having an outer circumferential wall which bears the big end of the connecting rod such that the connecting rod is rotatably mounted on the bearing portion of the crank member via the big end;

wherein the crank member is drivably connected to an auxiliary shaft via a first transmission wherein the auxiliary shaft is mounted to the crankshaft wherein an auxiliary shaft axis is spaced apart from the crankshaft axis and is configured to rotate about the crankshaft axis, wherein the auxiliary shaft is drivably connected to a central ring via a second transmission, wherein the central ring has a center line which coincides with the crankshaft axis;

wherein the first and second transmission are configured such that the crank member rotates at a rotation frequency with respect to the crankcase which is substantially half of that of the crankshaft when the central ring has a fixed position with respect to the crankcase;

wherein the first transmission comprises a crank member gear being an external gear and mounted to the crank member, and a first auxiliary gear being an external gear and fixed to the auxiliary shaft, wherein the crank member gear and the first auxiliary gear mesh with each other; and wherein the second transmission comprises a second auxiliary gear being an external gear and mounted to the auxiliary shaft, which second auxiliary gear meshes with an intermediate auxiliary gear, being an external gear, which intermediate auxiliary gear also meshes with an internal gear of the central ring.

20. The reciprocating piston mechanism according to claim 19, wherein the first and second transmissions are configured such that the difference of transmission ratio of the first transmission and that of the second transmission equals a factor of two.

* * * * *